US011095945B2

(12) United States Patent
Miyazaki

(10) Patent No.: US 11,095,945 B2
(45) Date of Patent: Aug. 17, 2021

(54) INFORMATION PROCESSING DEVICE, METHOD, AND PROGRAM

(71) Applicant: SONY CORPORATION, Tokyo (JP)

(72) Inventor: Mitsuhiro Miyazaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 52 days.

(21) Appl. No.: 15/770,657

(22) PCT Filed: Jan. 13, 2017

(86) PCT No.: PCT/JP2017/000929
§ 371 (c)(1),
(2) Date: Apr. 24, 2018

(87) PCT Pub. No.: WO2017/130727
PCT Pub. Date: Aug. 3, 2017

(65) Prior Publication Data
US 2018/0316972 A1 Nov. 1, 2018

(30) Foreign Application Priority Data
Jan. 29, 2016 (JP) .............................. JP2016-015177

(51) Int. Cl.
*H04N 21/466* (2011.01)
*G06F 16/48* (2019.01)
(Continued)

(52) U.S. Cl.
CPC ......... *H04N 21/4668* (2013.01); *G06F 16/00* (2019.01); *G06F 16/435* (2019.01);
(Continued)

(58) Field of Classification Search
CPC ........... H04N 21/2402; H04N 21/4147; H04N 21/43615; H04N 21/4728; H04N 21/252;
(Continued)

(56) References Cited

U.S. PATENT DOCUMENTS 9,269,090 B2\* 2/2016 Lehtiniemi ............ G06Q 30/02
2011/0131077 A1\* 6/2011 Tan ........................ G06Q 30/00
(Continued)

FOREIGN PATENT DOCUMENTS

JP 2007-200099 A 8/2007
JP 2009-141952 A 6/2009
(Continued)

OTHER PUBLICATIONS

International Search Report dated Feb. 7, 2017 in PCT/JP2017/000929 filed Jan. 13, 2017.
(Continued)

*Primary Examiner* — Anthony Bantamoi
(74) *Attorney, Agent, or Firm* — Xsensus LLP

(57) ABSTRACT

The present disclosure relates to information processing device, method, and program for allowing support of shared content/real world event viewing.
A user recommendation module is configured to determine C. proposer for a user group and recommendation content. The user recommendation module performs, for example, calculation of the Active degree of a user A in the group=the individual Active degree of the user A+Σ(b\*the Active degree of the user A with respect to other users in the group) (the degree of relationship among the user A and other users may be reflected in a weighting coefficient b). Moreover, the user recommendation module determines, as a proposer, a user with the highest Active degree in the group. The present disclosure is applicable to an information processing system configured to perform shared viewing for music, for example.

15 Claims, 8 Drawing Sheets

(51) Int. Cl.
*G06F 16/435* (2019.01)
*G06Q 30/06* (2012.01)
*G06Q 30/02* (2012.01)
*G06F 16/00* (2019.01)
*H04H 60/33* (2008.01)

(52) U.S. Cl.
CPC ............ *G06F 16/48* (2019.01); *G06Q 30/02* (2013.01); *G06Q 30/0631* (2013.01); *H04H 60/33* (2013.01)

(58) Field of Classification Search
CPC ............ H04N 21/2668; H04N 21/4668; G06F 16/00; G06F 16/435; G06F 16/48; H04H 60/33; G06Q 30/02; G06Q 30/0631
USPC .............. 725/46, 114, 131, 44, 34, 93, 14, 9
See application file for complete search history.

(56) References Cited

U.S. PATENT DOCUMENTS

| | | | |
|---|---|---|---|
| 2011/0184886 A1* | 7/2011 | Shoham | G06Q 30/02 705/400 |
| 2012/0254764 A1* | 10/2012 | Ayloo | G06Q 30/02 715/738 |
| 2012/0317123 A1* | 12/2012 | Green | G06F 17/30 |
| 2013/0066819 A1* | 3/2013 | Nice | G06Q 30/0255 706/14 |
| 2013/0159115 A1* | 6/2013 | Adams | G06Q 50/01 705/14.66 |
| 2013/0332593 A1* | 12/2013 | Patnaikuni | H04L 29/06884 709/224 |
| 2015/0278546 A1* | 10/2015 | Uekubo | G06Q 10/10 726/28 |
| 2016/0035002 A1* | 2/2016 | Kim | G06Q 30/0631 705/26.7 |
| 2016/0080485 A1* | 3/2016 | Hamedi | H04L 67/02 709/204 |
| 2016/0275081 A1* | 9/2016 | Tian | G06F 16/2246 |
| 2017/0171622 A1* | 6/2017 | Liu | H04N 21/4668 |

FOREIGN PATENT DOCUMENTS

| | | |
|---|---|---|
| JP | 2011-257804 A | 12/2011 |
| WO | WO 2009/017195 A1 | 2/2009 |

OTHER PUBLICATIONS

Xiao Yu et al: "On building entity recommender systems using user click log and freebase knowledge",WEB Search and Data Mining, ACM, 2 Penn Plaza, Suite 701 New York NY 10121-0701 USA, Feb. 24, 2014 (Feb. 24, 2014), pp. 263-272, XP058050775,DOI: 10.1145/2556195.2556233 ISBN: 978-1-4503-2351-2.

* cited by examiner

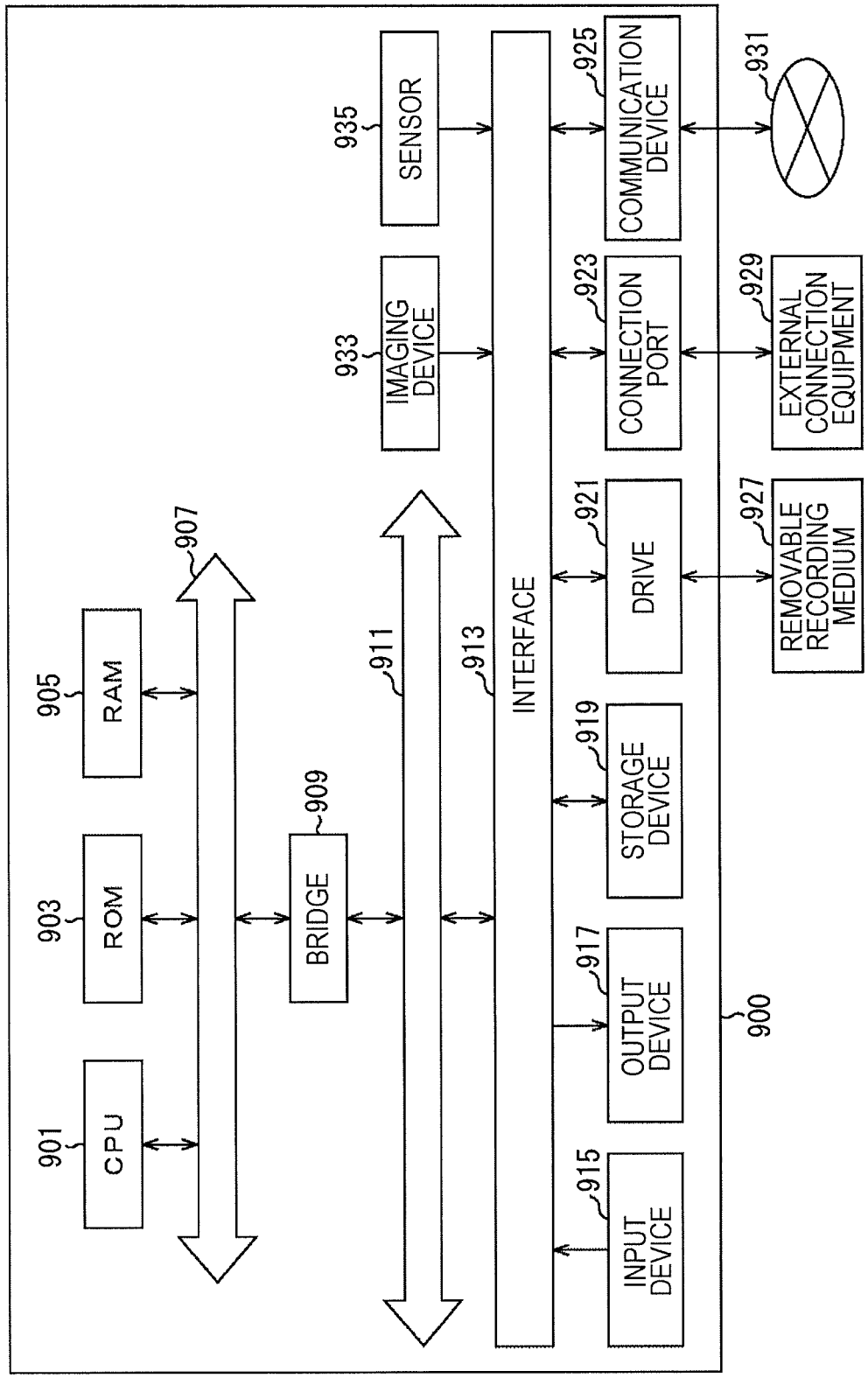

INFORMATION PROCESSING DEVICE, METHOD, AND PROGRAM

TECHNICAL FIELD

The present disclosure relates to information processing device, method, and program. Specifically, the present disclosure relates to information processing device, method, and program for allowing support of shared content/real world event viewing.

BACKGROUND ART

Currently, shared viewing experience by social media or a video distribution system has become widely used. Moreover, in a proposal of Patent Document 1, viewing statuses of the others are provided, and are taken as a trigger for shared viewing.

CITATION LIST

Patent Document

Patent Document 1: Japanese Patent Application Laid-Open No. 2009-141952

SUMMARY OF THE INVENTION

Problems to be Solved by the Invention

However, the current shared viewing experience targets users belonging to a community, and a troubled situation occurs due to inter-user comments or opinions. Thus, it cannot be said that comfortable shared viewing is provided. Moreover, in the proposal of Patent Document 1, a target user group is determined in advance, and a member's personal relationship or a preference similarity have not been taken into consideration.

Further, a beginner hesitates to participate in content experience in an unfamiliar field or a real world event such as a music live concert or sports spectating, and introduction by a friend/acquaintance having a detailed knowledge tends to be an opportunity to participate the content experience or the real world event. However, there has been no system for actively supporting such introduction.

The present disclosure has been made in view of such a situation, and can support shared content/real world event viewing.

Solutions to Problems

An information processing device of one aspect of the present technology includes: a user analysis unit configured to analyze user's personal relationship information on the basis of a behavior log recording user's behavior; a proposal candidate determination unit configured to determine a proposal candidate by means of the user's personal relationship information analyzed by the user analysis unit; and a recommendation candidate providing unit configured to provide a content recommendation candidate from the proposal candidate determined by the proposal candidate determination unit.

The user's personal relationship information includes inter-user active/passive attribute information.

The user's personal relationship information includes individual user active/passive attribute information and inter-user relationship degree information.

The behavior log includes a behavior log on a network, and a behavior log in a real world.

The behavior log on the network includes inter-user association on a community Web site.

The proposal candidate determination unit may determine the proposal candidate on the basis of the user's personal relationship information for content.

The recommendation candidate providing unit may provide, at predetermined timing, the content recommendation candidate from the proposal candidate determined by the proposal candidate determination unit.

The predetermined timing is timing when a user as a content recommendation candidate providing destination starts up an application corresponding to content.

The predetermined timing is timing when the proposal candidate and the user as the content recommendation candidate providing destination are running an application corresponding to content.

the predetermined timing is timing when the user as the content recommendation candidate providing destination is viewing content associated with the content recommendation candidate.

the user analysis unit may analyzes the user's personal relationship information on a user-to-user basis.

An information processing method of one aspect of the present technology includes: causing an information processing device to analyze user's personal relationship information on the basis of a behavior log recording user's behavior, determine a proposal candidate by means of the analyzed user's personal relationship information, and provide a content recommendation candidate from the determined proposal candidate.

A program of one aspect of the present technology causes a computer to function as a user analysis unit configured to analyze user's personal relationship information on the basis of a behavior log recording user's behavior, a proposal candidate determination unit configured to determine a proposal candidate by means of the user's personal relationship information analyzed by the user analysis unit, and a recommendation candidate providing unit configured to provide a content recommendation candidate from the proposal candidate determined by the proposal candidate determination unit.

An information processing device of another aspect of the present technology includes: a behavior log transmission unit configured to transmit a behavior log recording user's behavior; and a recommendation candidate receiving unit configured to receive a content recommendation candidate from a proposal candidate determined by means of user's personal relationship information analyzed on the basis of the behavior log transmitted from the behavior log transmission unit.

In one aspect of the present technology, user's personal relationship information is analyzed on the basis of a behavior log recording user's behavior. Then, a proposal candidate is determined by means of the analyzed user's personal relationship information, and a content recommendation candidate from the determined proposal candidate is provided.

In another aspect of the present technology, a behavior log recording user's behavior is transmitted. Then, a content recommendation candidate from a proposal candidate determined by means of user's personal relationship information analyzed on the basis of the transmitted behavior log is received.

Effects of the Invention

According to the present technology, shared content/real world event viewing can be supported.

Note that the advantageous effects described in the present specification have been set forth merely as examples, and the advantageous effects of the present technology are not limited to those described in the present specification. Additional advantageous effects may be provided.

BRIEF DESCRIPTION OF DRAWINGS

FIG. 8 is a block diagram of a hardware configuration example of an information processing device according to an embodiment of the present disclosure.

MODE FOR CARRYING OUT THE INVENTION

Hereinafter, the mode (hereinafter referred to as an "embodiment") for carrying out the present disclosure will be described.

<Configuration Example of System>

Figure 1:
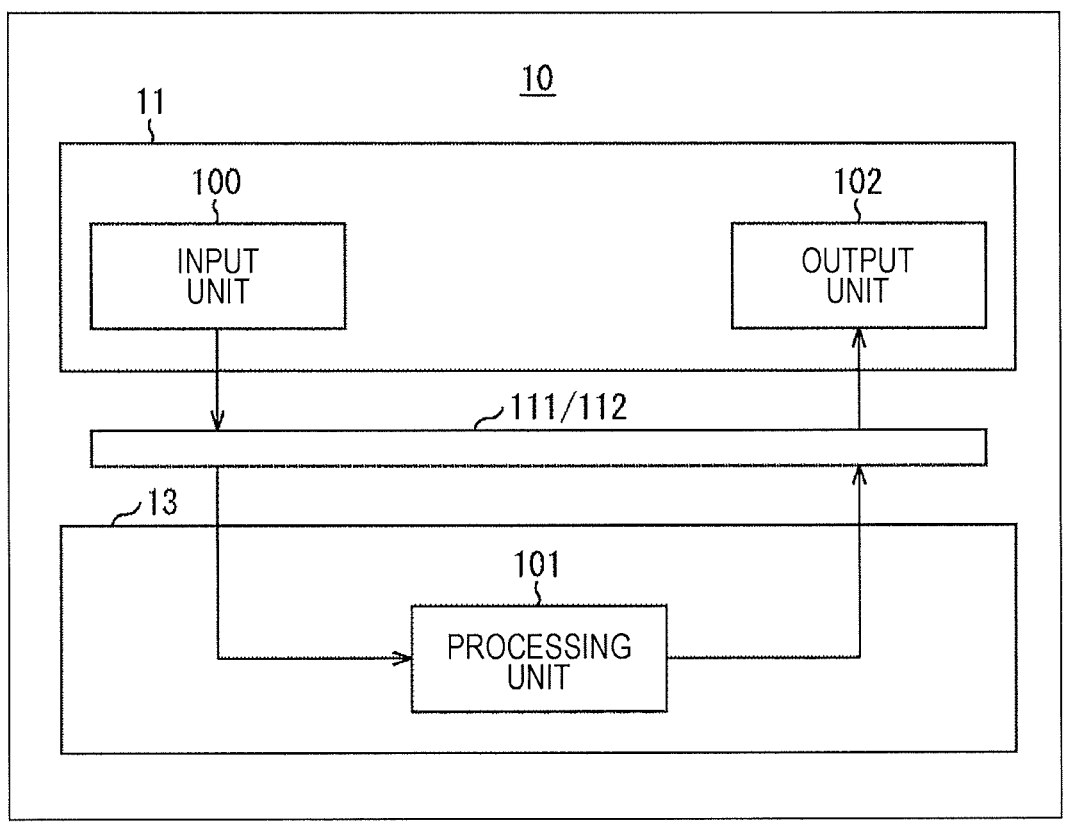
FIG. 1 is a block diagram of a configuration example of a system to which the present technology has been applied.

FIG. 1 is a block diagram of a system configuration example according to the embodiment of the present disclosure. Referring to FIG. 1, a system 10 includes information processing devices 11, 13. An input unit 100 and an output unit 102 are implemented in the information processing device 11. On the other hand, a processing unit 101 is implemented in the information processing device 13. The information processing device 11 and the information processing device 13 communicate with each other via a network to implement functions of the embodiment of the present disclosure. Any of an interface 111 between the input unit 100 and the processing unit 101 and an interface 121 between the processing unit 101 and the output unit 102 may be a communication interface between devices.

In the example of FIG. 1, the information processing device 11 may be a terminal device, for example. In this case, the input unit 100 includes, for example, software configured to acquire information from an input device, a sensor, and an external service. The output unit 102 also includes, for example, software configured to provide information to an output device, a control device, and an external service. Alternatively, the information processing device 11 may be a server configured to exchange information with an external service. In this case, the input unit 100 includes software configured to acquire information from the external service. Moreover, the output unit 102 includes software configured to provide information to the external service.

Moreover, in the example of FIG. 1, the information processing device 13 may be a server or a terminal device. The processing unit 101 is implemented in such a manner that a processor or a processing circuit included in the information processing device 13 operates according to a program stored in a memory or a storage device. For example, the information processing device 13 may be a device used exclusively as a server. In this case, the information processing device 13 may be placed at a data center or the like, or may be placed at home. Alternatively, the information processing device 13 can be utilized as a terminal device for other functions, but for the functions of the embodiment of the present disclosure, may be a device configured such that the input unit 100 and the output unit 102 are not implemented. In the following example, the information processing device 13 may be the server or the terminal device in terms of the above-described point.

A case where the information processing device 11 is a wearable device and the information processing device 13 is a mobile device connected to the wearable device via the Bluetooth (registered trademark) or the like will be described by way of example. In a case where the wearable device receives operation input from a user (the input unit 100), the mobile device executes processing on the basis of a request transmitted on the basis of the operation input (the processing unit 101), and a processing result is output from the wearable device (the output unit 102), it can be said that the wearable device functions as the information processing device 11 and the mobile device functions as the information processing device 13.

<Details of System Configuration>

Figure 2:
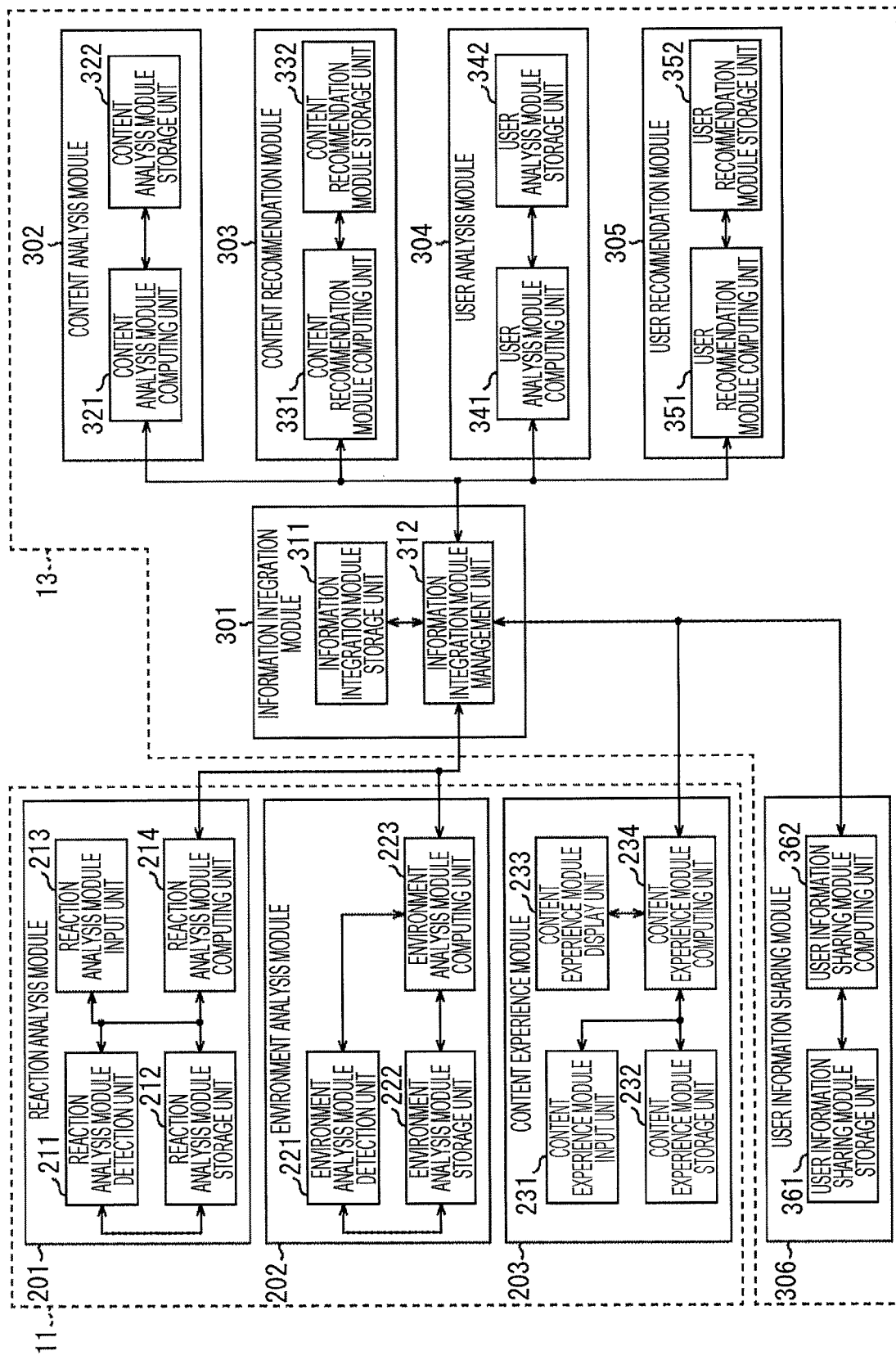
FIG. 2 is a block diagram of functional blocks in the case of implementing a shared viewing system for music.

FIG. 2 is a functional block diagram in a case where a shared viewing system for music is implemented in the system configuration of FIG. 1.

In an example of FIG. 2, the system 10 includes a reaction analysis module 201, an environment analysis module 202, a content experience module 203, an information integration module 301, a content analysis module 302, a content recommendation module 303, a user analysis module 304, a user recommendation module 305, and a user information sharing module 306.

Of the system 10 described herein, the reaction analysis module 201, the environment analysis module 202, and the content experience module 203 are modules included in the information processing device 11. On the other hand, the information integration module 301, the content analysis module 302, the content recommendation module 303, the user analysis module 304, the user recommendation module 305, and the user information sharing module 306 are included in the information processing device 13. In the example of FIG. 2, the information processing device 13 includes the server, for example.

The reaction analysis module 201 includes, for example, a mouse, a keyboard, a remote controller, a touch panel, an audio recognition device, an image recognition device, a biological information sensor, and the like. The reaction analysis module 201 is, for example, a module configured to analyze user's reaction upon content viewing and utilization of an information service (e.g., a mail and social media) by the user via the network typified by the Internet.

The reaction analysis module 201 includes, for example, a reaction analysis module detection unit 211, a reaction analysis module storage unit 212, a reaction analysis module input unit 213, and a reaction analysis module computing unit 214.

The reaction analysis module detection unit 211 is configured to detect information such as biological reaction. The reaction analysis module storage unit 212 is configured to store, as a Net behavior log (acquired via the network), the information detected by the reaction analysis module detection unit 211, information input by the reaction analysis module input unit 213, or information analyzed by the reaction analysis module computing unit 214. The reaction analysis module storage unit 212 is also configured to store information necessary for the reaction analysis module 201.

The reaction analysis module input unit 213 is configured to input information (e.g., in the case of music content, a track ID, a track title, an artist name, playback, stop, skip, track evaluation, and the like) regarding input or selection of a pointing device, a text message (a mail, chat, a social networking service (SNS) message, and the like), feedback ("Like," and the like) in social media, audio, and an image. The SNS is a community Web site for promoting/supporting human connection.

The reaction analysis module computing unit 214 is configured to analyze the user's reaction from the information detected by the reaction analysis module detection unit 211 or the information input by the reaction analysis module input unit 213, thereby transmitting the analyzed information to the information integration module 301.

The environment analysis module 202 includes, for example, various sensors, an atomic clock, a global positioning system (GPS) receiver, an audio recognition device, an image recognition device, a behavior recognition device, a biological information sensor, and the like. The environment analysis module 202 is a module configured to analyze user's viewing environment upon content viewing and utilization of the information service by the user.

The environment analysis module 202 includes, for example, an environment analysis module detection unit 221, an environment analysis module storage unit 222, and an environment analysis module analysis unit 223.

The environment analysis module detection unit 221 is configured to detect information regarding time, a location, behavior, or a status, for example. The environment analysis module storage unit 222 is configured to store, as a Real behavior log, the information detected by the environment analysis module detection unit 221. The environment analysis module detection unit 221 is also configured to store information necessary for the environment analysis module 202. The environment analysis module analysis unit 223 is configured to analyze environment upon utilization by the user from the information detected by the reaction analysis module detection unit 211, thereby transmitting the analyzed information to the information integration module 301.

The content experience module 203 includes, for example, a client computer, CE equipment, a multifunction mobile phone, a tablet terminal, or a wearable terminal via which the user can view content.

The content experience module 203 includes, for example, a content experience module input unit 231, a content experience module storage unit 232, a content experience module display unit 233, and a content experience module computing unit 234.

The content experience module input unit 231 is used by the user, and is configured to input information corresponding to user's operation. The content experience module storage unit 232 is configured to store the information input by the content experience module input unit 231 and information processed by the content experience module computing unit 234.

The content experience module computing unit 234 is configured to analyze the information corresponding to the user's operation input from the content experience module input unit 231, thereby transmitting the analyzed information to the information integration module 301. Moreover, the content experience module computing unit 234 is configured to reproduce the content from the information integration module 301, thereby outputting the reproduced content to the content experience module display unit 233.

The information integration module 301 includes a server/client computer, database software, or a software module having a role in integration or relaying of information among the modules of the system 10 and control of an access load.

The information integration module 301 includes an information integration module storage unit 311 and an information integration module management unit 312. The information integration module storage unit 311 is configured to store information managed by the information integration module management unit 312. The information integration module management unit 312 is configured to perform integration or relaying of the information among the modules of the system 10, thereby managing such information.

The content analysis module 302 is a server/client computer or a software module for performing analysis regarding content metadata (in the case of the music content, a category, an age, track mood, and the like) and text information (in the case of the music content, an artist profile and a music number review). For example, the content is represented as a vector (a content profile) with a score for each metadata attribute value by a technique described in Japanese Patent Application Laid-Open No. 2005-176404 (hereinafter referred to as "Patent Document 2") or the like.

The content analysis module 302 includes, for example, a content analysis module computing unit 321 and a content analysis module storage unit 322. The content analysis module computing unit 321 is configured to analyze the content metadata or the text information, thereby transmitting an analysis result to the information integration module 301. The content analysis module storage unit 322 is configured to store the metadata or the text information analyzed by the content analysis module computing unit 321 and information necessary for the content analysis module 302.

The content recommendation module 303 is a server/client computer or a software module for implementing content recommendation based on a user's preference. The user's preference is, on the basis of the user's reaction analyzed by the reaction analysis module 201, represented as a vector (a user preference) generated by weighting of the content profile. Moreover, in the content recommendation module 303, matching between the user preference and the content profile is performed by, e.g., the technique of Patent Document 2, and the content is recommended according to a matching score (e.g., the inner product of vectors). Note that content recommendation to a user group on the basis of multiple user preferences is also available. In this case, the multiple user preferences may be added up, or multiple recommendation results may be added up.

The content recommendation module 303 includes a content recommendation module computing unit 331 and a content recommendation module storage unit 332. The content recommendation module computing unit 331 is configured to perform matching between the user preference and the content profile on the basis of the user's reaction analyzed by the reaction analysis module 201, thereby recommending the content according to the matching score (e.g., the inner product of vectors) and transmitting a recommendation result to the information integration module 301.

The content recommendation module storage unit 332 is configured to store the recommendation result from the content recommendation module computing unit 331 or information necessary for the content recommendation module 303.

The user analysis module 304 is a server/client computer or a software module for performing analysis regarding the degree of inter-user association based on the user's user preference and a user's personal relationship.

The user analysis module 304 includes a user analysis module computing unit 341 and a user analysis module storage unit 342. The user analysis module computing unit 341 is configured to calculate the degree of inter-user association by means of the degree of relationship acquired from the log or matching between the user preferences, thereby transmitting the calculated degree of inter-user relationship to the information integration module 301. The user analysis module storage unit 342 is configured to store a computing result from the user analysis module computing unit 341 or information necessary for the user analysis module 304. Note that a multiple-perspective association degree is, as the degree of inter-user association, stored according to a content type or status.

The user recommendation module 305 is a server/client computer or a software module for determining optimal content for the user group targeted for shared viewing on the basis of the degree of inter-user association acquired from the user analysis module 304 and the user's reaction/environment acquired from the reaction analysis module 201 and the environment analysis module 202 and making a proposal to the user information sharing module 306 regarding shared viewing.

The user analysis module 304 includes a user analysis module computing unit 351 and a user analysis module storage unit 352. The user analysis module computing unit 351 is configured to determine the optimal content for the user group targeted for shared viewing, thereby making a proposal to the user information sharing module 306 regarding shared viewing. The user analysis module storage unit 352 is configured to store a computing result from the user analysis module computing unit 351 or other types of information necessary for the user analysis module 304.

The user information sharing module 306 is a server/client computer or a software module for allowing the users to share information regarding content viewing. By information sharing described herein, the content profile whose viewing is in progress and the user preference of the user oneself can be disclosed to the others, and information, which is proposed by the user recommendation module 303, regarding shared viewing ("How about if you recommend a track X to B?" to A) and the like can be notified and viewed.

The user information sharing module 306 includes a user information sharing module storage unit 361 and a user information sharing module computing unit 362. The user information sharing module storage unit 361 is configured to store a computing result from the user information sharing module computing unit 362 or information necessary for the user information sharing module 306.

The user information sharing module computing unit 362 is configured to perform computing for disclosing the content profile whose viewing is in progress and the user profile of the user oneself to the others, thereby transmitting the computing result to the information integration module 301.

Next, content analysis/recommendation processing of the system 10 for implementing the shared viewing system for music will be described with reference to a flowchart of FIG. 3.

At a step S101, the content analysis module 302 of the information processing device 13 determines whether or not content analysis is to be performed. The frequency of such processing may be once a day, or may be timing when a predetermined number of new tracks is piled up. In a case where it is, at the step S101, determined that content analysis is to be performed, the processing proceeds to a step S102.

At the step S102, the content analysis module 302 performs content analysis. Specifically, the content analysis module 302 performs, as content analysis, content analysis for a track newly added to the system 10, thereby creating and saving the content profile from the metadata/text information of the track. Attributes of the content profile include, for example, a category, an age, track mood, a ranking, an artist cluster (a clustered artist profile), a track cluster (a clustered music number review) and the like.

Note that in clustering for the artist profile/music number review, probabilistic latent semantic analysis (PLSA) or latent dirichlet allocation (LDA) broadly used for text classification as a latent topic model technique can be utilized.

In the PLSA, the occurrence probability p(w/p) of a word w in the artist profile is, for example, represented as the following expression (1) by means of a latent topic z.

[Expression 1]

$$p(w|d) = \sum_{z} p(w|z)p(z|d) \qquad (1)$$

That is, the occurrence probability of the word in the artist profile can be divided into "the word occurrence probability per each latent topic" and "the topic attribute probability of the artist profile," assuming that z is the artist profile and the latent topic for which the word occurs.

In a case where the number of dimensions of the topic z is five, the topic attribute probability regarding an artist profile for a certain track is represented as {0.4, 0.1, 0.7, 0.2, 0.5}, and this is a clustering result.

Figure 3:
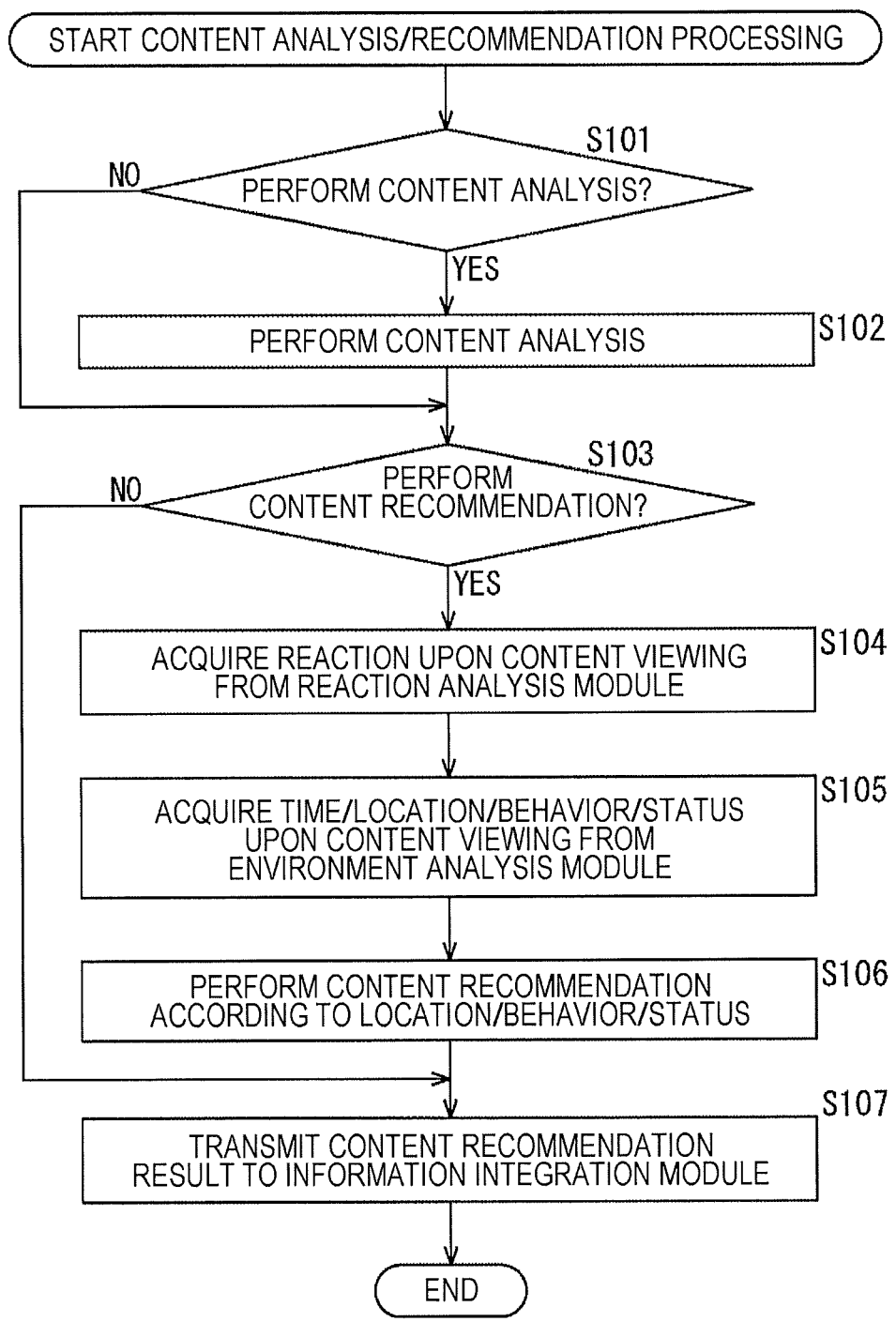
FIG. 3 is a flowchart for describing content analysis/recommendation processing.

Next, in a case where it is, at the step S101 of FIG. 3, determined that content analysis is not to be performed, the step S102 is skipped, and the processing proceeds to a step S103. At the step S103, the content recommendation module 303 determines whether or not content recommendation is to be performed. In a case where it is, at the step S103, determined that content recommendation is not to be performed, steps S104 to S106 are skipped, and the user preference processing proceeds to a step S107. In a case where it is, at the step S103, determined that content recommendation is to be performed, the processing proceeds to the step S104.

At the step S104, the content recommendation module 303 acquires the reaction upon content viewing from the reaction analysis module 201 via the information integration module 301.

At the step S105, the content recommendation module 303 acquires the time, the location, the behavior, and the status upon content viewing from the environment analysis module 202 via the information integration module 301.

At the step S106, the content recommendation module 303 performs content recommendation according to the location, the behavior, and the status on the basis of the reaction upon content viewing from the reaction analysis module 201 and the time, the location, the behavior, and the status upon content viewing from the environment analysis module 202.

In an example of content recommendation of the step S106, the content recommendation module 303 may calculate the matching score for a recommendation target track group by means of the user preference for current time and location, and add up the score for the time and the score for the location to acquire a final score and determine top n recommended tracks. Note that the user preference may be updated according to the time (morning, daytime, evening) or the location (a home, an office, outside).

At the step S107, the content recommendation module 303 transmits the content recommendation result to the information integration module 301.

As described above, the content is analyzed, and the recommendation result is transmitted to the information integration module 301 and is stored in the information integration module storage unit 311.

Note that content recommendation of the steps S104 to S106 of FIG. 3 is performed for all users. Alternatively, this content recommendation flow may be performed exclusively for a user whose reaction has been made within last n hours via the reaction analysis module 201. Moreover, in a case where content recommendation is performed for the user group, the user preference of each user may be added up to create the user preference of the group, thereby performing recommendation to the group. Not the user preferences but the user's recommendation results may be added up.

Figure 4:
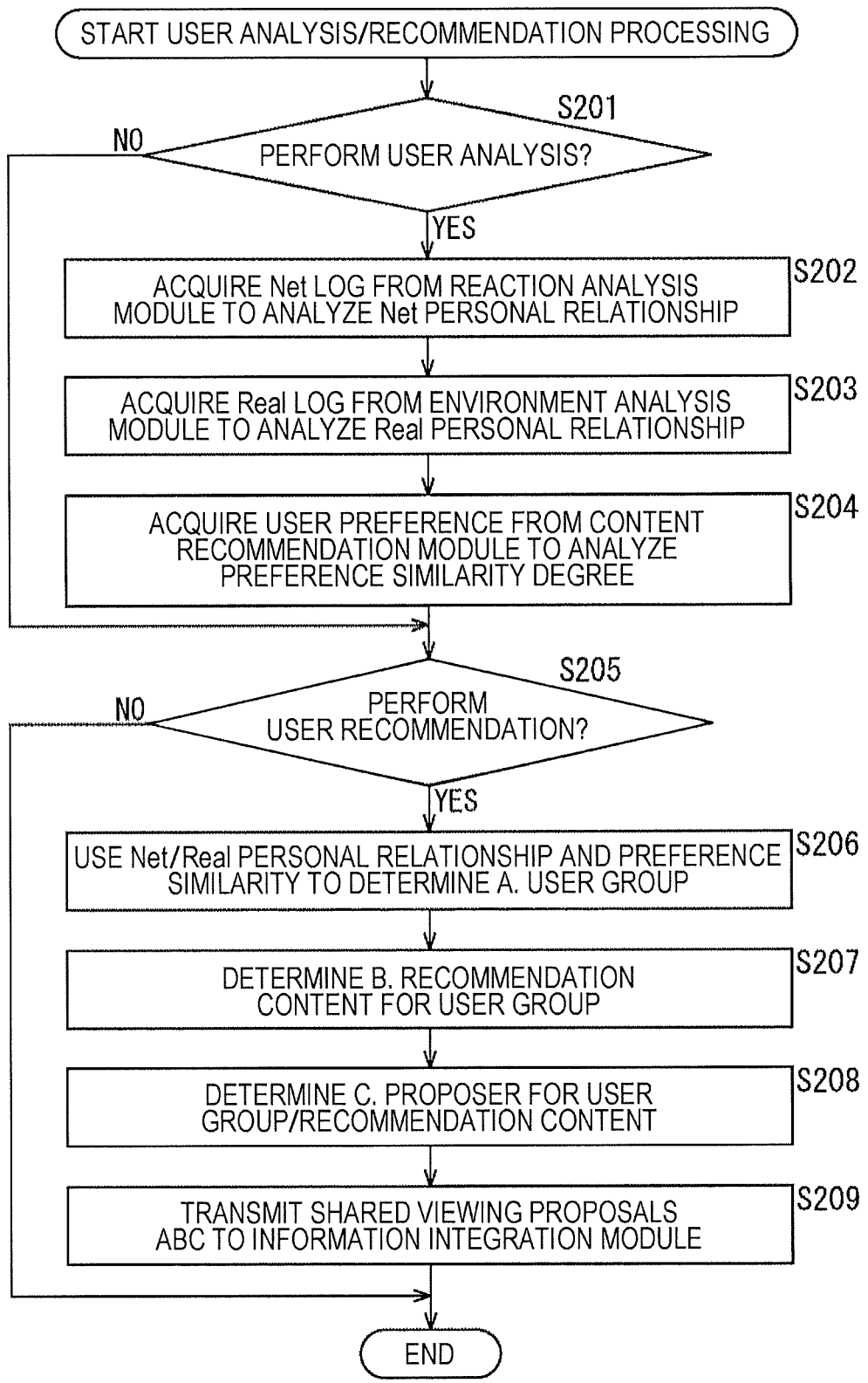
FIG. 4 is a flowchart for describing user analysis/recommendation processing.

Next, the user analysis/recommendation processing of the system 10 for implementing the shared viewing system for music will be described with reference to a flowchart of FIG. 4.

At a step S201, the user analysis module 304 determines whether or not user analysis is to be performed. In a case where it is, at the step S201, determined that user analysis is to be performed, the processing proceeds to a step S202.

At the step S202, the user analysis module 304 acquires a Net log (a log from which the user's reaction (behavior) on the network is recognized) from the reaction analysis module 201, thereby analyzing a Net personal relationship indicating a personal relationship on the Internet. At this point, the user analysis module 304 analyzes the personal relationship and an Active degree from the logs of content viewing and the information service. The Active degree indicates the degree of active behavior. It can be said that a higher Active degree results in more active, and a lower Active degree results in more passive. The Active degree includes an individual Active degree and an Active degree between users (e.g., the Active degree of a user B with respect to a user A, and conversely, the Active degree of the user A with respect to the user B). For example, the individual Active degree is brought into +1 when a single track of the music content is reproduced, and is brought into +5 when a single track of the music content is purchased.

Specifically, the user analysis module 304 brings, for example, the degree of relationship between the user A and the user B into +10 in the case of a SNS friendship. In a case where the user B presses "Like" once for a post of the user A on the SNS, the user analysis module 304 brings the degree of relationship between the user A and the user B into +3, and brings the Active degree of the user B with respect to the user A into +3.

Moreover, in a case where a single mail is transmitted from the user A to the user B, the user analysis module 304 brings the degree of relationship between the user A and the user B into +5, brings the Active degree of the user A with respect to the user B into +1, and brings the Active degree of the user B with respect to the user A into −1. Further, in a case where the content of the mail transmitted from the user A to the user B are determined as invitation, the user analysis module 304 brings the Active degree of the user A with respect to the user B into +3, and brings the Active degree of the user B with respect to the user A into −3.

At a step S203, the user analysis module 304 acquires a Real log (a log from which the user's reaction (behavior) in reality is recognized) from the environment analysis module 202, thereby analyzing a Real personal relationship indicating a personal relationship in reality. For example, the user analysis module 304 uses, as the Real log, the logs of time, location, and behavior, thereby analyzing the personal relationship and the Active degree. The Active degree can be weighted according to the time required for such behavior.

Specifically, the user analysis module 304 brings the individual Active degree into +5 in a case where the user went to a music live concert once. The user analysis module 304 brings the degree of relationship between the user A and the user B into +10 in a case where the user A and the user B spent a certain time or longer together. The user analysis module 304 brings the Active degree of the user A with respect to the user B into +5, and brings the Active degree of the user B with respect to the user A into −5 in a case where the user A visited a home of the user B. The user analysis module 304 brings the degree of relationship between the user A and the user B into +10, brings the Active degree of the user A with respect to the user B into +1, and brings the Active degree of the user B with respect to the user A into −1 in a case where the user A had a dialogue with the user B for a certain time or longer.

At a step S204, the user analysis module 304 acquires the user preference from the content recommendation module 303, thereby analyzing a preference similarity degree. For example, the user analysis module 304 performs user preference matching between the user A and the user B, thereby calculating the preference similarity degree. The preference similarity degree may be acquired according to the time (morning, daytime, evening) or the location (the home, the office, the outside).

On the other hand, in a case where it is, at the step S201, determined that user analysis is not to be performed, the steps S202 to S204 are skipped, and the processing proceeds to a step S205.

At the step S205, the user recommendation module 305 determines whether or not user recommendation is to be performed. In a case where it is, at the step S205, determined that user recommendation is to be performed, the processing proceeds to a step S206.

At the step S206, the user recommendation module 305 uses the Net/Real personal relationship and the preference similarity, thereby determining a proposal A. user group. For example, the user recommendation module 305 performs calculation of the degree of user association=a*the degree of relationship of the Net personal relationship+b*the degree of relationship of the Real personal relationship+C*the preference similarity degree (a, b, and c are weight coefficients). Moreover, the method for determining the user group includes, for example, the following first to third examples.

In the first example, the user recommendation module 305 targets all users to acquire the degree of association for all other users, thereby determining the user group of top n users in terms of the degree of association. In the second example, the user recommendation module 305 acquires the degree of association for a user group (friends on the SNS or Real acquaintances) designated by a certain user, thereby determining the user group of top n users in terms of the degree of association. In the third example, the user recommendation module 305 searches and determines the user group such that the degree of association among all members in the system is equal to or greater than x.

At a step S207, the content recommendation module 303 determines a proposal B. recommended content for each user group. For example, the recommended content may be determined using the user preference of the group as in the content recommendation processing of the steps S104 to S106 of FIG. 3 as described above. Alternatively, the content recommendation module 303 may use a collaborative filtering technique, thereby selecting the content viewed by a member A of the group and not viewed by a member B of the group.

At a step S208, the user recommendation module 305 uses the Net/Real personal relationship and the preference similarity, thereby determining a proposal C. proposer for each user group and the recommended content. The user recommendation module 305 performs, for example, calculation of the Active degree of the user A in the group=the individual Active degree of the user A+Σ(b*the Active degree of the user A with respect to other users of the group) (the degree of relationship among the user A and other users may be reflected in the weighting coefficient b). Then, the user recommendation module 305 determines, as a proposer (a proposal candidate), a user with the highest Active degree in the group. At this point, the user of the group with the highest Active degree for the determined recommended content may be determined as the proposer.

At a step S209, the user recommendation module 305 transmits, as shared viewing proposals, A to C determined at the steps S206 to S208 to the information integration module 301. On the other hand, in a case where it is, at the step S205, determined that user recommendation is not to be performed, the steps S206 to S209 are skipped, and the user analysis/recommendation processing ends.

As described above, the shared viewing proposals are determined, transmitted to the information integration module 301, and stored in the information integration module storage unit 311.

Figure 5:
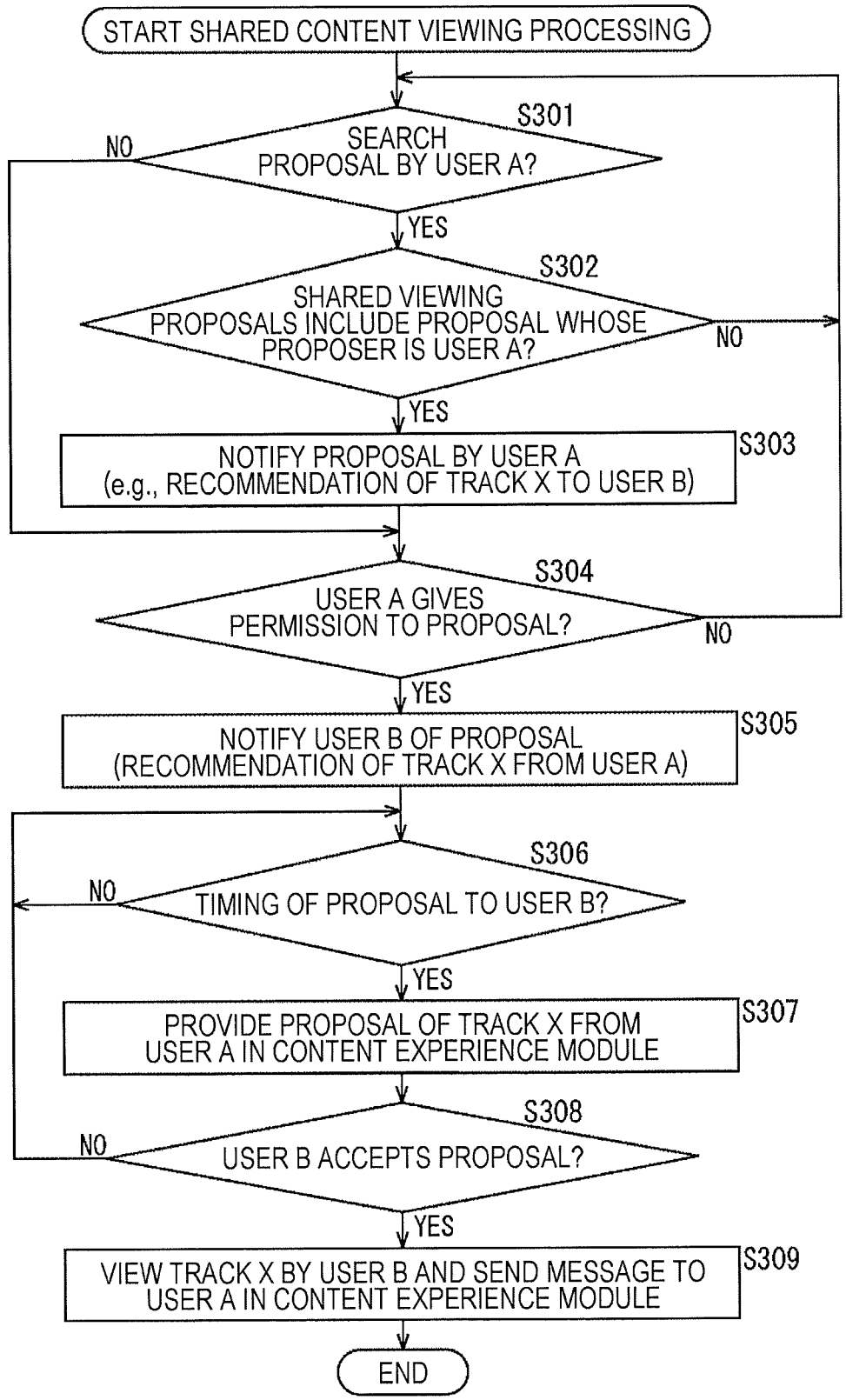
FIG. 5 is a flowchart for describing shared content viewing processing.

Next, shared content viewing processing of the system 10 for implementing the shared viewing system for music will be described with reference to a flowchart of FIG. 5. Note that the processing of FIG. 5 may be, for example, set by the system 10 once a day or once an hour, and may be performed periodically.

At a step S301, the user information sharing module of the information processing device 11 determines whether or not a proposal by the user A is to be searched. In a case where it is, at the step S301, determined that the proposal by the user A is not to be searched, steps S302 and S303 are skipped, and the processing proceeds to a step S304. In a case where it is, at the step S301, determined that the proposal by the user A is to be searched, the processing proceeds to the step S302.

At the step S302, the user information sharing module 306 refers to the information of the information integration module storage unit 311 of the information integration module 301, thereby determining whether or not the shared viewing proposals contain the proposal whose proposal is the user A. In a case where it is, at the step S302, determined that the shared viewing proposals do not contain the proposal whose proposer is the user A, the processing returns to the step S301, and subsequent processing is repeated. In a case where it is, at the step S302, determined that the shared viewing proposals contain the proposal whose proposer is the user A, the processing proceeds to the step S303.

At the step S303, the user information sharing module 306 notifies the proposal (e.g., recommendation of the track X to the user B) by the user A. At the step S304, the user information sharing module 306 determines whether or not the user A gives permission to the proposal. In a case where it is, at the step S304, determined that the user A does not give permission to the proposal, the processing returns to the step S301, and subsequent processing is repeated.

In a case where it is, at the step S304, determined that the user A gives permission to the proposal, the processing proceeds to a step S305. At the step S305, the user information sharing module 306 notifies the user B of the proposal (recommendation of the track X from the user A).

At a step S306, the user information sharing module 306 stands by until timing at which the proposal should be made to the user B. The timing of making the proposal includes, for example, timing when the user B starts up a music application on the content experience module 203, timing when the user B is communicating with the user A via, e.g., the user information sharing module 306 or the SNS, timing when both of the user B and the user A are running the music application, timing when the user B is viewing a track (e.g., the same artist or the same category) associated with the track X as the proposal, or the like.

In a case where it is, at the step S306, determined as the timing at which the proposal should be made to the user B, the user information sharing module 306 provides the proposal (e.g., recommendation of the track X to the user B) of the user A to the content experience module 203. The processing proceeds to a step S307. At the step S307, the content experience module 203 presents the proposal of the track X from the user A.

At a step S308, the content experience module 203 determines whether or not the user B accepts the proposal. Note that a result of acceptability of the proposal is fed back, and the degree of user association and the Active degree are updated. In the case of accepting the proposal, the degree of association between the user A and the user B is brought into +5, the Active degree of the user A with respect to the user B is brought into +5, and the Active degree of the user B with respect to the user A is brought into −5. In the case of not accepting the proposal, the degree of association between the user A and the user B is brought into −5, and the Active degree of the user A with respect to the user B is brought into −5.

In a case where it is, at the step S308, determined that the user B does not accept the proposal, the processing returns to the step S306, and subsequent processing is repeated. In a case where it is, at the step S308, determined that the user B accepts the proposal, the processing proceeds to a step S309.

At the step S309, the content experience module 203 causes the user B to view the track X, and transmits a message to the user A.

A log (participants, a required time, evaluation, and the like) regarding shared viewing performed as described above is learnt (fed back) so that such a log can be used when the user group, the recommender, the candidate content, and the like described above with reference to FIG. 4 are determined.

Figure 6:
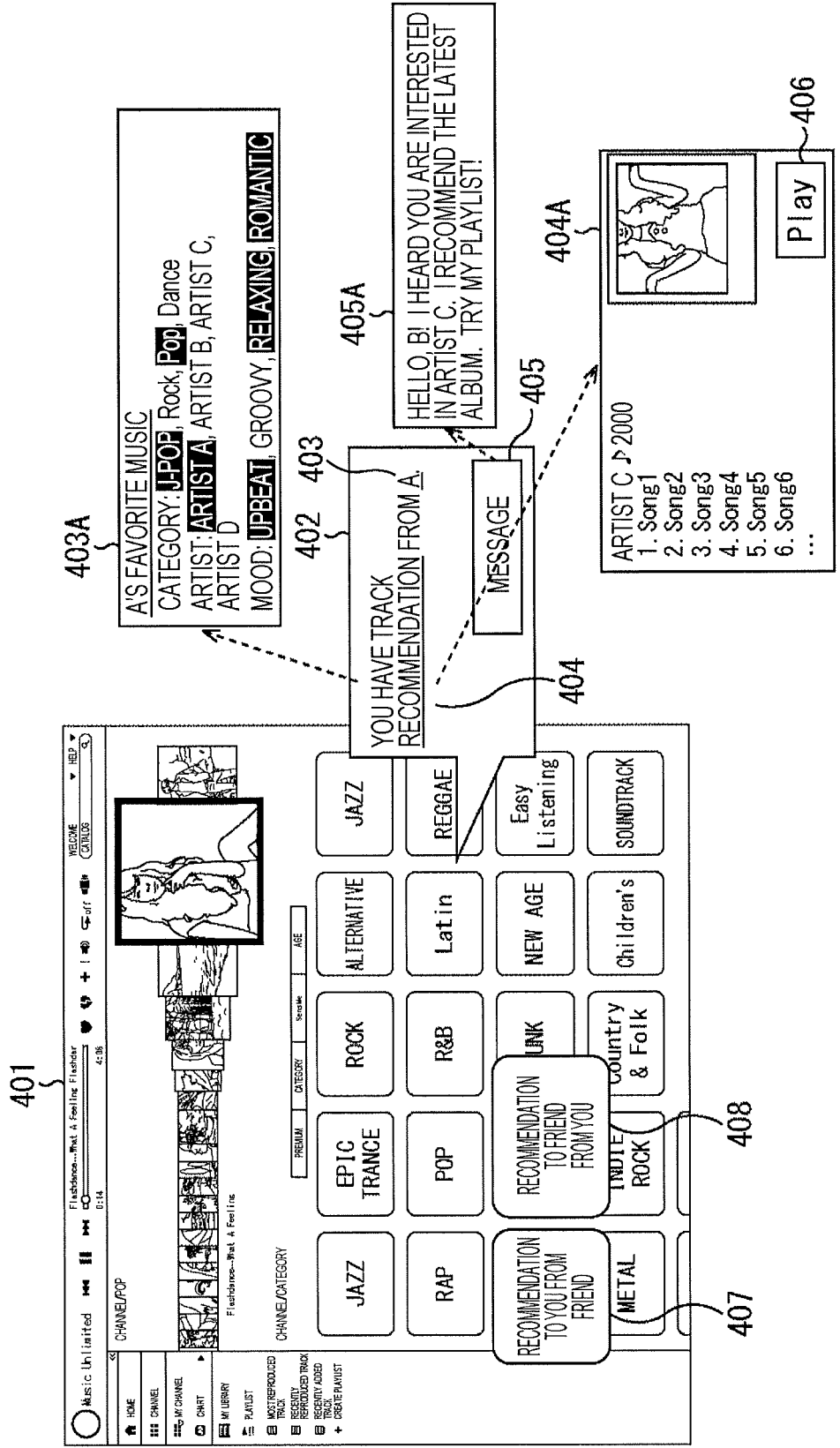
FIG. 6 is a view of an UI example of a shared viewing proposal (a proposed side).

Next, shared content viewing will be described with reference to FIGS. 6 and 7. Note that FIG. 6 is a view of an UI example of a shared viewing proposal (a proposed side). The example of FIG. 6 illustrates the UI example where the proposal of asking if B would like to listen to an album "2000" of an artist C is made from A when B is listening to a TV program theme song of the artist C in which B has been interested.

When B starts up the music application on the content experience module 203, a display screen 401 of the music application is displayed. For example, a category channel is displayed on the display screen 401, and icons for each category are displayed side by side such that selection is made by pressing of the icon. Note that channels for the shared viewing proposal are also provided on the display screen 401. In this case, a recommendation-from-friend-to-you icon 407 and a recommendation-from-you-to-friend button icon 408 are displayed as illustrated in FIG. 6. B presses the icon 407 by means of the content experience module input unit 231 so that a window indicating recommendation from the friend can be also displayed. Moreover, B presses the icon 408 by means of the content experience module input unit 231 so that, e.g., a window for making a proposal from oneself to the friend can be also displayed.

When B is listening to the TV program theme song of the artist C in which B has been interested, a proposal window 402 from A is popped up on the display screen 401. On the proposal window 402, characters of "YOU HAVE TRACK RECOMMENDATION FROM A" and a message button 405 are displayed. When B presses the message button 405 by means of the content experience module input unit 231, a message window 405A indicating a message from A to B is displayed.

Note that "A" 403 and "TRACK RECOMMENDATION" 404 among the characters on the proposal window 402 can be each selected.

When B presses the "A" 403 by means of the content experience module input unit 231, a user information window 403A indicating A's favorite music is displayed. When B presses the "TRACK RECOMMENDATION" 404 by means of the content experience module input unit 231, a track information window 404A indicating the list of tracks of the album of the artist C recommended by A is displayed. The list of the tracks of the album of the artist C and a play button 406 are displayed on the track information window 404A. B presses the play button 406 by means of the content experience module input unit 231, and in this manner, a playlist proposed by A is reproduced.

Figure 7:
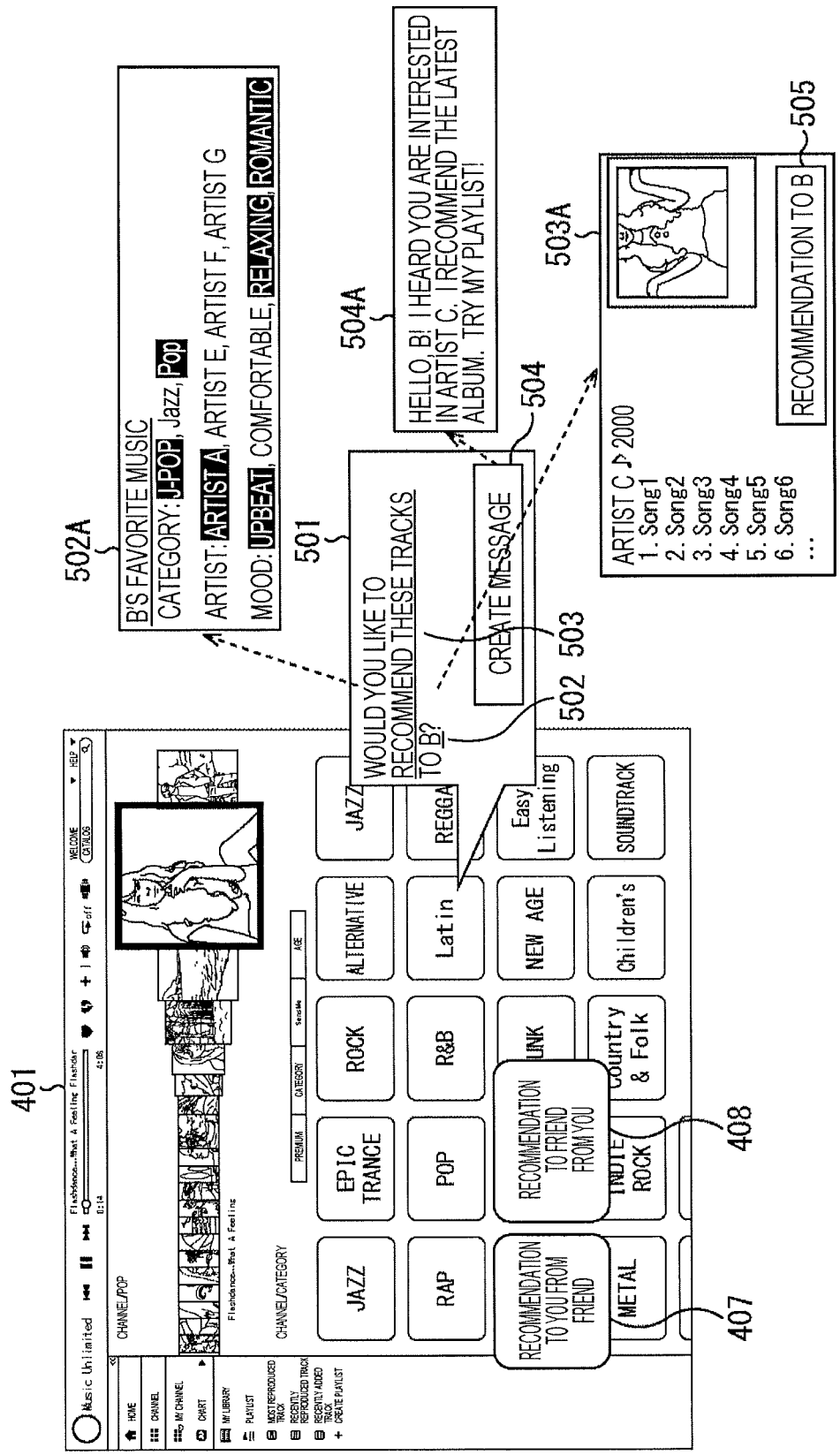
FIG. 7 is a view of an UI example of the shared viewing proposal (a proposing side).

FIG. 7 is a view of an UI example of the shared viewing proposal (a proposing side). The example of FIG. 7 illustrates the UI example in a case where the notice of asking if A would like to recommend the artist C to B is provided when A is listening to the artist C.

When A is listening to the artist C, a recommendation-to-B window 501 is popped up on the display screen 401. On the recommendation window 501, characters of "WOULD YOU LIKE TO RECOMMEND THESE TRACKS TO B?" and a message creating button 504 are displayed. When A presses the message creating button 504 by means of the content experience module input unit 231, a message creating window 504A for creating a message for B is displayed.

Note that "B" 502 and "RECOMMEND THESE TRACKS" 503 among the characters on the recommendation window 501 can be each selected.

When A presses the "B" 502 by means of the content experience module input unit 231, a user information window 502A indicating B's favorite music is displayed. When A presses the "RECOMMEND THESE TRACKS" 503 by means of the content experience module input unit 231, a track information window 503A indicating the list of the tracks of the album of the artist C recommended to B is displayed. On the track information window 503A, the list of the tracks of the album of the artist C and the recommendation button 505 are displayed. When A presses the recommendation button 505 by means of the content experience module input unit 231, the playlist is proposed to B as described above with reference to FIG. 6.

Note that the music example has been described above, but other shared viewing examples than music include, for example, sports spectating (baseball, football, . . . ), Do sports (jogging, futsal, . . . ), restaurants (expensive stores, new dishes), cooking (recipe sharing), events (flea markets, festivals, local matchmaking meetup, . . . ), culture lessons as hobbies (instruments, dancing, reading clubs, . . . ), education (homework from schools, studying for examinations), and seminars (self-development, healing, . . . ).

With this configuration, an activity in which a beginner hesitates to participate can be supported by a friend or an expert (may be a real acquaintance or may be connected via the network).

For example, the user analysis module 304 extracts, as an outline of a restaurant proposal, a user preference (a location, a category, a customer segment, a price range, and the like) regarding a restaurant from a user's Real log (GPS, point of interface (POI) data) from the reaction analysis module 201. The user analysis module 304 extracts the user preference (the location, the category, the customer segment, the price range, and the like) regarding the restaurant on the basis of a user's Net log (restaurant site access, SNS post content, or a location/store tag) from the reaction analysis module 201.

Regarding the personal relationship, exchange of a message including the log of commensality or content regarding a meal is, in the user analysis module 304, more weighted, and the degree of relationship is calculated.

The flow of shared viewing is basically similar to that in the case of music, and a restaurant proposal can be made and can be accepted.

The timing of receiving the proposal may be timing during message exchange, or timing after a visit to a store at a similar location or in a similar category, for example.

The user can designate a user group to be gathered for a meal, and a store can be proposed from a group recommendation result. This can support an organizer.

As described above, according to the present technology, highly-convincing shared content/real world event viewing via a friend can be supported considering the preference similarity and the personal relationship.

According to the present technology, user matching based on, e.g., detailed music categories or a favorite sports team is available by an elaborated preference model by metadata extraction and text clustering.

Moreover, according to the present technology, the direction (Active/Passive) of the personal relationship based on the Real and Net behavior logs is taken into consideration. Thus, shared viewing recommendation is easily proposed and accepted, and the personal relationship is updated according to a successful/unsuccessful proposal. Consequently, proposal accuracy is enhanced by continuous use of the system.

Further, according to the present technology, content or information recommendation is taken as a lead to stimulate the demand for a real world event such as a music live concert or sports spectating. Thus, a service suitable for current real regressive consumer tendency can be expected.

In addition, the present technology is a move to heal social tiredness on an existing SNS and the like, and has social meaning as the system for establishing a truly worthful personal relationship.

<Hardware Configuration>

Next, a hardware configuration of the information processing device according to the embodiment of the present disclosure will be described with reference to FIG. 8. FIG. 8 is a block diagram of a hardware configuration example of the information processing device according to the embodiment of the present disclosure.

An information processing device 900 includes a central processing unit (CPU) 901, read only memory (ROM) 903, and random access memory (RAM) 905. Moreover, the information processing device 900 may include a host bus 907, a bridge 909, an external bus 911, an interface 913, an input device 915, an output device 917, a storage device 919, a drive 921, a connection port 923, and a communication device 925. Further, the information processing device 900 may include, as necessary, an imaging device 933 and a sensor 935. The information processing device 900 may have, instead of or in addition to the CPU 901, a processing circuit such as a digital signal processor (DSP), an application specific integrated circuit (ASIC), or a field-programmable gate array (FPGA).

The CPU 901 functions as an arithmetic processing device and a control device, thereby controlling part or entirety of operation of the information processing device 900 according to various programs recorded in the ROM 903, the RAM 905, the storage device 919, or a removable recording medium 927. The ROM 903 is configured to store a program, a computing parameter, and the like used by the CPU 901. The RAM 905 is configured to temporarily store a program used in execution of the CPU 901, a parameter changeable as necessary in execution of such a program, and the like. The CPU 901, the ROM 903, and the RAM 905 are mutually connected via the host bus 907 including an internal bus such as a CPU bus. Further, the host bus 907 is connected to the external bus 911 such as a peripheral component interconnect/interface (PCI) bus via the bridge 909.

The input device 915 is a device operated by the user, such as a mouse, a keyboard, a touch panel, a button, a switch, and a lever, for example. The input device 915 may be, for example, a remote control device utilizing infrared light or other radio waves, or external connection equipment 929 such as a mobile phone compatible with operation of the information processing device 900. The input device 915 includes an input control circuit configured to generate an input signal on the basis of information input by the user to output such a signal to the CPU 901. The user operates the input device 915, thereby inputting various types of data to the information processing device 900 or instructing processing operation.

The output device 917 includes a device configured so that the acquired information can be notified to the user by means of sensation such as visual sensation, auditory sensation, or tactual sensation. The output device 917 may be, for example, a display device such as a liquid crystal display (LCD) or an organic electro-luminescence (EL), an audio output device such as a speaker or headphones, a vibrator or the like. The output device 917 is configured to output a result of the processing of the information processing device 900 as video such as a text or an image, sound such as sound or audio, vibration or the like.

The storage device 919 is a data storage device configured as an example of a storage unit of the information processing device 900. The storage device 919 includes, for example, a magnetic storage unit device such as a hard disk drive (HDD), a semiconductor storage device, an optical storage device, a magnetic optical storage device or the like. The storage device 919 is configured to store, for example, a program or various types of data executed by the CPU 901 and various types of data acquired from the outside, and the like.

The drive 921 is a reader/writer for the removable recording medium 927 such as a magnetic disc, an optical disc, a magnetic optical disc, or a semiconductor memory, and is built in or attached externally to the information processing device 900. The drive 921 is configured to read information recorded in the attached removable recording medium 927, thereby outputting the information to the RAM 905. Moreover, the drive 921 is configured to write a record in the attached removable recording medium 927.

The connection port 923 is a port for connecting equipment to the information processing device 900. The connection port 923 may be, for example, a universal serial bus (USB) port, an IEEE1394 port, a small computer system interface (SCSI) port, or the like. Alternatively, the connection port 923 may be, for example, a RS-232C port, an optical audio terminal, a high-definition multimedia interface (HDMI) (registered trademark) port, or the like. By connection of the external connection equipment 929 to the connection port 923, various types of data may be exchanged between the information processing device 900 and the external connection equipment 929.

For example, the communication device 925 is a communication interface including a communication device and the like for connection to a communication network 931. The communication device 925 may be, for example, a communication card for a local area network (LAN), the Bluetooth (registered trademark), the Wi-Fi, a wireless USB (WUSB), or the like. Alternatively, the communication device 925 may be a router for optical communication, a router for an asymmetric digital subscriber line (ADSL), a modem for various types of communication, or the like. The communication device 925 is configured to transmit/receive a signal and the like to/from the Internet or other types of equipment by means of a predetermined protocol such as TCP/IP, for example. Moreover, the communication network 931 connected to the communication device 925 is a network connected via a wire or connected wirelessly, and includes, for example, the Internet, a home LAN, infrared communication, radio wave communication, satellite communication or the like.

The imaging device 933 is, for example, a device configured to image a real space by means of an imaging element such as a complementary metal oxide semiconductor (CMOS) or a charge coupled device (CCD) and various members such as a lens for controlling object image formation on the imaging element, thereby generating a captured image. The imaging device 933 may be configured to capture a still image, or may be configured to capture a video.

The sensor 935 includes, for example, various sensors such as an acceleration sensor, an angular rate sensor, a geomagnetic sensor, an illuminance sensor, a temperature sensor, an atmosphere pressure sensor, or a sound sensor (a microphone). The sensor 935 is configured to acquire information regarding the state of the information processing device 900 itself, such as the posture of a housing of the information processing device 900, for example, or information regarding surrounding environment of the information processing device 900, such as brightness or noise at the periphery of the information processing device 900. Moreover, the sensor 935 may include a GPS receiver configured to receive a global positioning system (GPS) signal, thereby measuring the latitude, longitude, and altitude of the device.

The example of the hardware configuration of the information processing device 900 has been described above. Each of the above-described components may be configured using a versatile member, or may include hardware dedicated to the function of each component. Such a configuration is changeable as necessary according to a technology level in implementation on a moment-to-moment basis.

The above-described series of processing can be executed by hardware, or can be executed by software. In the case of executing the series of processing by the software, a program forming such software is installed in a computer. The computer described herein includes, for example, a computer incorporated into dedicated hardware, and a versatile personal computer configured to execute various functions.

In the information processing device 900 configured as described above, the CPU 901 loads and executes, in the RAM 905, the program stored in the storage device 919 via the interface 913, the external bus 911, the bridge 909, and the host bus 907, for example. With this configuration, the above-described series of processing is performed.

The program to be executed by the computer (the CPU 901) can be provided with the program being recorded in the removable recording medium 927. The removable recording medium 927 is, for example, package media or the like including a magnetic disc (including a flexible disc), an optical disc (a compact disc-read only memory (CD-ROM), a digital versatile disc (DVD), and the like), a magnetic optical disc, a semiconductor memory or the like. Alternatively, the program can be provided via a wired or wireless transmission medium such as the local area network, the Internet, or digital satellite broadcasting.

In the computer, the program can be installed in the storage device 919 via the interface 913 in such a manner that the removable recording medium 927 is attached to the drive 921. Alternatively, the program can be received by the communication device 925 via the wired or wireless transmission medium, and then, can be installed in the storage device 919. As another alternative, the program can be installed in advance in the ROM 903 or the storage device 919.

Note that the program to be executed by the computer may be a program for performing processing in chronological order described in the present specification, or a program for performing processing in parallel or at a necessary step such as the time of invoking.

Moreover, in the present specification, the step describing the program recorded in the recording medium includes, needless to say, processing performed in chronological order as described above, and processing executed in parallel or individually without the need for performing the processing in chronological order.

Further, in the present specification, the system indicates the entirety of a device including multiple devices (apparatuses).

Note that the embodiment in the present disclosure is not limited to the embodiment described above, and various changes can be made without departing from the gist of the present disclosure.

For example, the present disclosure can employ a cloud computing configuration for processing a single function in a shared cooperative manner by multiple devices via a network.

Moreover, the configuration described above as a single device (or a single processing unit) may be divided and configured as multiple devices (or multiple processing units). Conversely, the configuration described above as multiple devices (or multiple processing units) may be collectively configured as a single device (or a single processing unit). Moreover, other configurations than above may be, needless to say, added to the configuration of each device (or each processing unit). Further, as long as the substantially same configuration or operation of the entirety of the system is applied, part of the configuration of a certain device (or a certain processing unit) may be included in other devices (or other processing units). That is, the present technology is not limited to the above-described embodiment, and various changes can be made without departing from the gist of the present technology.

The preferable embodiment of the present disclosure has been described above in detail with reference to the attached drawings, but the present disclosure is not limited to such an example. With an ordinary skill in the art to which the present disclosure pertains, it is apparent that various changes or modifications can be made within the scope of the technical idea described in the claims. Needless to say, it is understood that these changes and modifications fall within the technical scope of the present disclosure.

Note that the present technology can also employ the following configurations:

(1) An information processing device including
a user analysis unit configured to analyze user's personal relationship information on the basis of a behavior log recording user's behavior,
a proposal candidate determination unit configured to determine a proposal candidate by means of the user's personal relationship information analyzed by the user analysis unit, and
a recommendation candidate providing unit configured to provide a content recommendation candidate from the proposal candidate determined by the proposal candidate determination unit.

(2) The information processing device according to (1), in which
the user's personal relationship information includes inter-user active/passive attribute information.

(3) The information processing device according to (1) or (2), in which
the user's personal relationship information includes individual user active/passive attribute information and inter-user relationship degree information.

(4) The information processing device according to any of (1) to (3), in which
the behavior log includes a behavior log on a network, and a behavior log in a real world.

(5) The information processing device according to (4), in which
the behavior log on the network includes inter-user association on a community Web site.

(6) The information processing device according to any of (1) to (5), in which
the proposal candidate determination unit determines the proposal candidate on the basis of the user's personal relationship information for content.

(7) The information processing device according to any of (1) to (6), in which
the recommendation candidate providing unit provides, at predetermined timing, the content recommendation candidate from the proposal candidate determined by the proposal candidate determination unit.

(8) The information processing device according to (7), in which
the predetermined timing is timing when a user as a content recommendation candidate providing destination starts up an application corresponding to content.

(9) The information processing device according to (7), in which
the predetermined timing is timing when the proposal candidate and the user as the content recommendation candidate providing destination are communicating with each other on the network.

(10) The information processing device according to (7), in which
the predetermined timing is timing when the proposal candidate and the user as the content recommendation candidate providing destination are running an application corresponding to content.
(11) The information processing device according to (7), in which
the predetermined timing is timing when the user as the content recommendation candidate providing destination is viewing content associated with the content recommendation candidate.
(12) The information processing device according to any of (1) to (11), in which
the user analysis unit analyzes the user's personal relationship information on a user-to-user basis.
(13) An information processing method including:
causing an information processing device to
analyze user's personal relationship information on the basis of a behavior log recording user's behavior,
determine a proposal candidate by means of the analyzed user's personal relationship information, and
provide a content recommendation candidate from the determined proposal candidate.
(14) A program for causing a computer to function as
a user analysis unit configured to analyze user's personal relationship information on the basis of a behavior log recording user's behavior,
a proposal candidate determination unit configured to determine a proposal candidate by means of the user's personal relationship information analyzed by the user analysis unit, and
a recommendation candidate providing unit configured to provide a content recommendation candidate from the proposal candidate determined by the proposal candidate determination unit.
(15) An information processing device including:
a behavior log transmission unit configured to transmit a behavior log recording user's behavior; and
a recommendation candidate receiving unit configured to receive a content recommendation candidate from a proposal candidate determined by means of user's personal relationship information analyzed on the basis of the behavior log transmitted from the behavior log transmission unit.

REFERENCE SIGNS LIST

10 System
11, 13 Information processing device
100 Input unit
101 Processing unit
102 Output unit
111, 121 Interface
201 Reaction analysis module
202 Environment analysis module
203 Content experience module
211 Reaction analysis module detection unit
212 Reaction analysis module storage unit
213 Reaction analysis module input unit
214 Reaction analysis module computing unit
221 Environment analysis module detection unit
222 Environment analysis module storage unit
223 Environment analysis module analysis unit
231 Content experience module input unit
232 Content experience module storage unit
233 Content experience module display unit
234 Content experience module computing unit
301 Information integration module
302 Content analysis module
303 Content recommendation module
304 User analysis module
305 User recommendation module
306 User information sharing module
311 Information integration module storage unit
312 Information integration module management unit
321 Content analysis module computing unit
322 Content analysis module storage unit
331 Content recommendation module computing unit
332 Content recommendation module storage unit
341 User analysis module computing unit
342 User analysis module storage unit
351 User analysis module computing unit
352 User analysis module storage unit
361 User information sharing module storage unit
362 User information sharing module computing unit
900 Information processing device
901 CPU
903 ROM
905 RAM

The invention claimed is:

1. An information processing device comprising:
circuitry configured to
analyze user's personal relationship information on the basis of a behavior log recording a user's behavior, wherein the user's personal relationship information includes inter-user active and passive attribute information;
determine a proposal candidate, which is an individual who will provide a content recommendation, based on the analyzed user's personal relationship information; and
provide a content recommendation candidate from the determined proposal candidate,
wherein the user's personal relationship information includes individual user active and passive attribute information and inter-user relationship degree information, and the inter-user relationship degree information is a weighting coefficient, and
wherein the proposal candidate is a user with a highest active degree in a group, and the active degree of the user is determined by a degree of activity of the user with respect to other users of the group and the weighting coefficient.

2. The information processing device according to claim 1, wherein
the behavior log on the network includes inter-user association on a community Web site.

3. The information processing device according to claim 1, wherein
the circuitry determines the proposal candidate on the basis of the user's personal relationship information for content.

4. The information processing device according to claim 1, wherein
the circuitry provides, at predetermined timing, the content recommendation candidate from the determined proposal candidate.

5. The information processing device according to claim 4, wherein
the predetermined timing is timing when a user as a content recommendation candidate providing destination starts up an application corresponding to content.

6. The information processing device according to claim 4, wherein
the predetermined timing is timing when the proposal candidate and the user as the content recommendation candidate providing destination are communicating with each other on a network.

7. The information processing device according to claim 4, wherein
the predetermined timing is timing when the proposal candidate and the user as the content recommendation candidate providing destination are running an application corresponding to content.

8. The information processing device according to claim 4, wherein
the predetermined timing is timing when the user as the content recommendation candidate providing destination is viewing content associated with the content recommendation candidate.

9. The information processing device according to claim 1, wherein
the circuitry analyzes the user's personal relationship information on a user-to-user basis.

10. The information processing device according to claim 1, wherein the content recommendation is a music candidate.

11. The information processing device according to claim 5, wherein the application is a music application.

12. The information processing device according to claim 7, wherein the application is a music application.

13. An information processing method comprising:
causing an information processing device to
analyze user's personal relationship information on the basis of a behavior log recording a user's behavior, wherein the user's personal relationship information includes inter-user active and passive attribute information,
determine a proposal candidate, which is an individual who will provide a content recommendation, based on the analyzed user's personal relationship information, and
provide a content recommendation candidate from the determined proposal candidate,
wherein the user's personal relationship information includes individual user active and passive attribute information and inter-user relationship degree information,
wherein the inter-user relationship degree information is a weighting coefficient, and
wherein the proposal candidate is a user with a highest active degree in a group, and the active degree of the user is determined by a degree of activity of the user with respect to other users of the group and the weighting coefficient.

14. A non-transitory computer-readable storage medium storing thereon computer instructions, which when executed by circuitry, cause the circuitry to perform a method, the method comprising:
analyzing user's personal relationship information on the basis of a behavior log recording a user's behavior, wherein the user's personal relationship information includes inter-user active and passive attribute information,
determining a proposal candidate, which is an individual who will provide a content recommendation, based on the analyzed user's personal relationship information, and
providing a content recommendation candidate from the determined proposal candidate,
wherein the user's personal relationship information includes individual user active and passive attribute information and inter-user relationship degree information,
wherein the inter-user relationship degree information is a weighting coefficient, and
wherein the proposal candidate is a user with a highest active degree in a group, and the active degree of the user is determined by a degree of activity of the user with respect to other users of the group and the weighting coefficient.

15. An information processing device comprising:
circuitry configured to
transmit a behavior log recording a user's behavior; and
receive a content recommendation candidate from a proposal candidate, which is an individual, determined by user's personal relationship information analyzed on the basis of the behavior log, wherein the user's personal relationship information includes inter-user active and passive attribute information,
wherein the user's personal relationship information includes individual user active and passive attribute information and inter-user relationship degree information,
wherein the inter-user relationship degree information is a weighting coefficient, and
wherein the proposal candidate is a user with a highest active degree in a group, and the active degree of the user is determined by a degree of activity of the user with respect to other users of the group and the weighting coefficient.

* * * * *